US012669579B2

(12) United States Patent
Lee et al.

(10) Patent No.: US 12,669,579 B2
(45) Date of Patent: Jun. 30, 2026

(54) METHODS, SYSTEMS, AND COMPUTER READABLE MEDIA FOR PHASE-CONJUGATE RADAR TARGET EMULATION FOR TESTING DUAL SIDEBAND (DSB) FREQUENCY MODULATED CONTINUOUS WAVE (FMCW) RADARS

(71) Applicant: Keysight Technologies, Inc., Santa Rosa, CA (US)

(72) Inventors: Gregory Steven Lee, Mountain View, CA (US); Jefferson Bernette Burch, Palo Alto, CA (US); Dietrich Werner Vook, Mountain View, CA (US)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 353 days.

(21) Appl. No.: 18/373,933

(22) Filed: Sep. 27, 2023

(65) Prior Publication Data

US 2025/0102624 A1     Mar. 27, 2025

(51) Int. Cl.
*G01S 7/40* (2006.01)

(52) U.S. Cl.
CPC .............. *G01S 7/4095* (2021.05); *G01S 7/40* (2013.01); *G01S 7/4056* (2013.01); *G01S 7/4086* (2021.05)

(58) Field of Classification Search
CPC ......... G01S 7/4095; G01S 7/4086; G01S 7/40
See application file for complete search history.

(56) References Cited

U.S. PATENT DOCUMENTS 4,660,041 A * 4/1987 Maples ..................... G01S 7/40
342/170
5,359,331 A 10/1994 Adler
(Continued)

FOREIGN PATENT DOCUMENTS

CN         102866387 A     1/2013
CN         105339806 A     2/2016
(Continued)

OTHER PUBLICATIONS

"Radar Scene Emulator", Keysight Technologies, pp. 1-12 (2022).
(Continued)

*Primary Examiner* — Robert W Hodge
*Assistant Examiner* — Helena H Seraydaryan

(57) ABSTRACT

A method for phase-conjugate target emulation for testing a DSB FMCW radar includes selecting a proxy transponder from an array of frequency-shifting transponders to transmit an emulated target radar signal to a radar DUT. The proxy transponder is located at a mirror image location with respect to a desired DoA of a signal from an emulated radar target. The method further includes receiving a radar signal from the radar DUT and generating an output signal to be transmitted by the proxy transponder to the radar DUT by swapping roles of a normal sideband component and a ghost sideband component of the output signal such that the ghost sideband component appears to the radar DUT as a desired emulant and the normal sideband component appears to the radar DUT an undesired ghost sideband component. The method further includes transmitting the output signal to the radar DUT.

20 Claims, 7 Drawing Sheets

(56) References Cited

U.S. PATENT DOCUMENTS

| | | | | |
|---|---|---|---|---|
| 6,114,985 | A | 9/2000 | Russell et al. | |
| 10,520,586 | B2 | 12/2019 | Haghighi et al. | |
| 10,527,715 | B2 * | 1/2020 | Ahmed | G01S 7/4052 |
| 11,520,008 | B2 * | 12/2022 | Lee | G01S 7/4052 |
| 11,543,489 | B2 * | 1/2023 | Lee | G01S 7/4026 |
| 11,867,832 | B2 * | 1/2024 | Vanwiggeren | G01S 13/931 |
| 11,914,070 | B2 * | 2/2024 | Hamberger | G01S 13/003 |
| 12,019,150 | B2 * | 6/2024 | Beer | G01S 13/931 |
| 2010/0109940 | A1 | 5/2010 | Williams | |
| 2015/0378017 | A1 | 12/2015 | Ferguson et al. | |
| 2019/0187246 | A1 | 6/2019 | Behrens et al. | |
| 2020/0158823 | A1 | 5/2020 | Mikhailov | |
| 2020/0319325 | A1 | 10/2020 | Kong | |
| 2021/0373122 | A1 | 12/2021 | Hamberger et al. | |
| 2022/0018934 | A1 | 1/2022 | Lee et al. | |
| 2025/0102624 | A1 * | 3/2025 | Lee | G01S 7/4086 |

FOREIGN PATENT DOCUMENTS

| | | | |
|---|---|---|---|
| CN | 106662637 | A | 5/2017 |
| CN | 107003398 | A | 8/2017 |
| DE | 102015121297 | B4 | 12/2017 |
| JP | 06230108 | A | 8/1994 |
| JP | 09281218 | A | 10/1997 |
| JP | 2001524676 | A | 12/2001 |
| JP | 2010252142 | A | 11/2010 |
| KR | 20190123396 | A | 11/2019 |

OTHER PUBLICATIONS

"Evolving Your ADAS and AV Tests with Emulation Capability", Keysight Technologies, pp. 1-20 (2022).

Adler, et al., "Broadband Target Simulator for FMCW Radar Sensors With Mirror Target Suppression", IEEE, pp. 1-5 (2021).

Ex-parte Quayle Action for U.S. Appl. No. 18/113,848 (Mar. 26, 2025).

Office Action and Search Report for Chinese Patent Application Serial No. 202011068167.3 (Feb. 5, 2025).

Office Action for Japanese Patent Application Serial No. 2021-115596 (May 23, 2025).

First Examination for Chinese Patent Application Serial No. 202110791009.9 (Aug. 9, 2025).

Notice of Allowance for U.S. Appl. No. 18/113,848 (Jun. 20, 2025).

Notice of Allowance for Japanese Patent Application Serial No. 2021-115596 (Oct. 31, 2025).

Advisory Action for U.S. Appl. No. 17/157,160 (Aug. 7, 2024).

Final Office Action for U.S. Appl. No. 17/157,160 (Jun. 27, 2024).

K. Siddiq, et al., "On Phase Measurement in FMCW Radar Systems," 2017 Sensor Signal Processing for Defense Conference (SSPD), London, UK, 2017, pp. 1-4, doi: 10.1109/SSPD.2017.8233250. (Year: 2017).

Non-Final Office Action for U.S. Appl. No. 17/157,160 (Dec. 12, 2023).

Office Action for German Patent Application Serial No. 102024209338.6 (Oct. 14, 2024).

Sandeep Rao, "Introduction to mmwave Sensing: FMCW Radars", Texas Instruments, pp. 1-70 n.d.

Non-Final Office Action for U.S. Appl. No. 17/157,160 (Mar. 25, 2026).

* cited by examiner

METHODS, SYSTEMS, AND COMPUTER READABLE MEDIA FOR PHASE-CONJUGATE RADAR TARGET EMULATION FOR TESTING DUAL SIDEBAND (DSB) FREQUENCY MODULATED CONTINUOUS WAVE (FMCW) RADARS

TECHNICAL FIELD

The subject matter described herein relates to radar target emulation. More particularly, the subject matter described herein relates to phase-conjugate radar target emulation for testing DSB FMCW radars

BACKGROUND

FMCW radars transmit signals, referred to as chirps, that are reflected by radar targets and detected by the receivers of the FMCW radars. A chirp signal is a signal whose frequency increases or decreases linearly with time. The reflected signal detected from the target will be a chirp signal with a linearly increasing or decreasing frequency but delayed in time from the transmitted signal. The receiver of the FMCW radar mixes the received signal with the transmitted signal to produce an intermediate frequency signal whose instantaneous frequency is equal to the difference in instantaneous frequencies of the transmitted and received chirp signals. The phase of the intermediate frequency signal is equal to the difference in phase between the transmitted and received chirp signals. For a single object in front of the radar, the intermediate frequency signal has a constant frequency, which can be used to determine the distance or range of the object in front of the radar. The frequency or tone of the intermediate frequency signal is related to the distance or range of the object in front of the radar by the following equation:

$$F_\tau = S2d/c \qquad (1)$$

where $F_\tau$ is the intermediate frequency detected at the radar receiver, S is the chirp slope, d is the distance or range of the target in front of the radar, and c is the speed of light in a vacuum. Thus, using Equation 1, the distance of the target in front of the radar can be estimated or determined from the tone of the intermediate frequency signal and the chirp slope.

FMCW radars are used in applications, such as automotive and other radars, to detect distances and directions of radar targets. Systems that use FMCW radars include assisted driving, autonomous driving, and safety features, such as automatic braking. One possible way to test FMCW radars in automotive applications would be to mount the radars on vehicles and measure the accuracy of the radars in detecting real radar targets as the vehicle and targets are moving. However, such testing is impractical and even dangerous, given the variety of targets and ranges that a vehicular radar will encounter and the fact that testing vehicular radars against real targets could result in injury to people and/or property damage.

In light of the impracticability of adequately testing vehicular radars against real targets, radar target and scene emulation systems have been developed. A radar target and scene emulator designed to test FMCW radars includes an array of frequency-shifting transponders. The array is placed in front of an FMCW radar under test and typically includes radar-absorptive materials to prevent reflections. The transponders receive radar signals from the radar DUT and transmit radar signals back to the radar DUT to mimic a radar target at a desired range and direction from the radar DUT. To mimic a radar target in a particular direction, a frequency-shifting transponder is selected to receive the radar signal from the radar DUT and transmit the signal back to the DUT. To mimic the desired range, the received radar signal is frequency modulated to cause a shift in the intermediate frequency detected by the radar DUT.

As will be described in more detail below, one problem with radar scene emulators that test radars with dual sideband receivers is the presence of an undesirable ghost image at the n=−1 sideband of the detected signal, where the ghost image appears closer to the radar than the desired image (referred to herein as the desired emulant) located at the n=1 sideband of the received signal. The ghost image cannot be entirely eliminated through in phase and quadrature balancing in the frequency shift operation performed at the transponder. As a result, the undesirable signal may cause the radar to detect the target at a range that is closer to the radar that the desired emulant. In automotive radar applications, such as automatic braking systems, detecting the target at a range that is closer than the actual target is undesirable, as it can cause the brakes to operate excessively or prematurely.

In light of these and other difficulties, there exists a need for improved methods, systems, and computer readable media for radar target and scene emulation to test DSB FMCW radars.

SUMMARY

A method for phase-conjugate target emulation for testing a dual sideband (DSB) frequency modulated continuous wave (FMCW) radar includes providing a radar scene emulator including an array of frequency-shifting transponders for emulating physical radar targets. The method further includes selecting, as a proxy transponder to transmit an emulated target radar signal to a radar DUT, one of the frequency-shifting transponders from the array of frequency-shifting transponders at a mirror image location with respect to a desired direction of arrival of a signal from an emulated radar target. The method further includes receiving, at the proxy transponder, a radar signal from a radar DUT. The method further includes generating an output signal to be transmitted by the proxy transponder to the radar DUT by swapping roles of a normal sideband component and a ghost sideband component of the output signal such that the ghost sideband component appears to the radar DUT as a desired emulant and the normal sideband component appears to the radar DUT as an undesired ghost sideband component. The method further includes transmitting the output signal to the radar DUT.

According to another aspect of the subject matter described herein, providing the radar scene emulator including the array of frequency-shifting transponders includes providing a two dimensional array of frequency-shifting transponders and selecting the proxy transponder at the mirror image location with respect to the desired direction of arrival includes selecting as the proxy transponder one of the frequency-shifting transponders located at a mirror image azimuth and elevational location with respect to the desired direction of arrival.

According to another aspect of the subject matter described herein, swapping the roles of the normal and ghost sideband components includes swapping modulation channels used to generate the output signal such that the modulation channels are opposite those used by the radar DUT to demodulate the output signal.

According to another aspect of the subject matter described herein, generating the output signal includes causing the radar DUT to detect an intermediate frequency as follows:

$$f_{IF} = 2Sr,$$

where $f_{IF}$ is the intermediate frequency, S is a chirp slope of the radar signal from the radar DUT, c is the speed of light in a vacuum, and $r_{excess,new}$ is given by $$r_{excess,new} = r_{emulant} + d_{setup},$$

where $r_{excess,new}$ is a range to which the ghost component is shifted, $r_{emulant}$ is a range of the desired emulant, and $d_{setup}$ is an effective distance from the proxy transponder to the radar DUT including a distance that accounts for processing latency of the proxy transponder.

According to another aspect of the subject matter described herein, the radar DUT comprises a time division multiplexed (TDM) multiple input multiple output (MIMO) radar and wherein the method further comprises applying phase corrections to output signals transmitted to the radar DUT to account for different ranges from the proxy transponder to different antennas of the TDM MIMO radar.

According to another aspect of the subject matter described herein, applying the phase corrections includes determining the phase corrections using the following equation:

$$\Phi_{k1} = +(360°/\lambda) * (d_{kE} - d_{kP} - d_{1E} + d_{1P}) \bmod 360°$$

where $\phi_{k1}$ is a phase correction to be applied to a signal output from the proxy transponder to a kth transmitting antenna of the radar DUT, $\lambda$ is a transmit wavelength of the TDM MIMO radar, $d_{kP}$ is the physical a distance from the kth transmitting antenna of the radar DUT to the proxy transponder, $d_{kE}$ is a distance from the kth transmitting antenna of the radar DUT to a desired emulation mirror image position on the radar scene emulator, $d_{1P}$ is a distance from the kth transmitting antenna to the proxy transponder, and $d_{1E}$ is a distance from the kth transmitting antenna to the desired emulation mirror image position, and mod is the modulo function.

According to another aspect of the subject matter described herein, the radar DUT comprises a code division multiplexed (CDM) multiple input multiple output (MIMO) radar and wherein the method further comprises applying phase corrections to output signals transmitted to the CDM MIMO radar to account for different ranges from the proxy transponder to different antennas of the CDM MIMO radar.

According to another aspect of the subject matter described herein, applying the phase corrections includes determining the phase corrections using the following equation:

$$\Phi_{10} = \pm [ang(A_{EX1}) - ang(A_{PX1}) - ang(A_{EX0}) + ang(A_{PX0})]$$

4 where $\phi_{10}$ is the phase correction to be applied to active code $\chi 1$, ang( ) is a function that returns an angle in degrees of a complex argument, $A_{P\chi}$ and $A_{E\chi}$ are given by:

$$A_{PX} = \sum_{k=1}^{N_{TX}} a_{kPX} \quad A_{EX} = \sum_{k=1}^{N_{TX}} a_{kEX}$$

where $a_{kP\chi}$ is an impinging complex amplitude from a kth transmit antenna of the radar DUT onto a position of the proxy transponder during phase coding $\chi$ and $a_{kE\chi}$ is an impinging complex amplitude from the kth transmit antenna of the radar DUT at the position of the desired emulant during phase coding $\chi$.

According to another aspect of the subject matter described herein, the method for radar target emulation includes applying gain correction to the output signal.

According to another aspect of the subject matter described herein, the method for radar target emulation includes calculating the gain correction using the following equation:

$$G_j = dB(A_{E\chi j}) - dB(A_{P\chi j})$$

where $G_j$ is the gain correction to be applied to the signal modulated using jth code $\chi_j$ dB( ) is a function that outputs a resultant field strength in decibels, $A_{E\chi j}$ is an amplitude of a signal at a position of the desired emulant and $A_{P\chi j}$ is an amplitude of a signal detected at the proxy transponder.

According to another aspect of the subject matter described herein, a system for phase-conjugate target emulation for testing a dual sideband (DSB) frequency modulated continuous wave (FMCW) radar is provided. The system includes a radar scene emulator including at least one processor, a memory and an array of frequency-shifting transponders for emulating physical radar targets. The system further includes a transponder selector implemented by the at least one processor for selecting, as a proxy transponder to transmit an emulated target radar signal to a radar DUT, one of the frequency-shifting transponders from the array of frequency-shifting transponders at a mirror image location with respect to a desired direction of arrival of a signal from an emulated radar target. The proxy transponder is configured to receive a radar signal from the radar DUT, generate an output signal to be transmitted to the radar DUT by swapping roles of a normal sideband component and a ghost sideband component of the output signal such that the ghost sideband component appears to the radar DUT as a desired emulant and the normal sideband component appears to the radar DUT as an undesired ghost sideband component, and transmit the output signal to the radar DUT.

According to another aspect of the subject matter described herein, the array of frequency-shifting transponders includes providing a two dimensional array of frequency-shifting transponders and selecting the proxy at the mirror image location with respect to the desired direction of arrival includes selecting as the proxy transponder one of the frequency-shifting transponders located at a mirror image azimuth and elevational location with respect to the desired direction of arrival.

According to another aspect of the subject matter described herein, the proxy transponder is configured to swap the roles of the normal and ghost sideband components by swapping modulation channels used to generate the output signal such that the modulation channels are opposite those used by the radar DUT to demodulate the output signal.

According to another aspect of the subject matter described herein, the proxy transponder is configured to generate the output signal causing the radar DUT to detect an intermediate frequency as follows:

$$f_{IF} = 2Sr_{excess,new}/c,$$

where $f_{IF}$ is the intermediate frequency, S is a chirp slope of the radar signal from the radar DUT, c is the speed of light in a vacuum, and $r_{excess,new}$ is given by:

$$r_{excess,new} = r_{emulant} + d_{setup},$$

where $r_{excess,new}$ is a range to which the ghost component is shifted, $r_{emulant}$ is a range of the desired emulant, and $d_{setup}$ is an effective distance from the proxy transponder to the radar DUT including a distance that accounts for processing latency of the proxy transponder.

According to another aspect of the subject matter described herein, the radar DUT comprises a time division multiplexed (TDM) multiple input multiple output (MIMO) radar and wherein the proxy transponder is configured to apply phase corrections to output signals transmitted to the radar DUT to account for different ranges from the proxy transponder to different antennas of the TDM MIMO radar.

According to another aspect of the subject matter described herein, the proxy transponder determines the phase corrections using the following equation:

$$\Phi_{k1} = \pm(360°/\lambda) * (d_{kE} - d_{kP} - d_{1E} + d_{1P}) \bmod 360°,$$

where $\phi_{k1}$ is a phase correction to be applied to a signal output from the proxy transponder to a kth transmitting antenna of the radar DUT, $\lambda$ is a transmit wavelength of the TDM MIMO radar, $d_{kP}$ is a distance from the kth transmitting antenna of the radar DUT to the proxy transponder, $d_{kE}$ is a distance from the kth transmitting antenna of the radar DUT to a desired emulation mirror image position on the radar scene emulator, $d_{1P}$ is a distance from the kth transmitting antenna to the proxy transponder, and $d_{1E}$ is a distance from the kth transmitting antenna to the desired emulation mirror image position, and mod is a modulo function.

According to another aspect of the subject matter described herein, the radar DUT comprises a code division multiplexed (CDM) multiple input multiple output (MIMO) radar and wherein the proxy transponder is configured to apply phase corrections to output signals transmitted to the CDM MIMO radar to account for different ranges from the proxy transponder to different antennas of the CDM MIMO radar.

According to another aspect of the subject matter described herein, the proxy transponder is configured to determine the phase corrections using the following equation:

$$\Phi_{10} = \pm[ang(A_{EX1}) - ang(A_{PX1}) - ang(A_{EX0}) + ang(A_{PX0})],$$

6 where $\phi_{10}$ is the phase correction to be applied to active code $\chi 1$, ang( ) is a function that returns an angle in degrees of a complex argument, $A_{P\chi}$ and $A_{E\chi}$ are given by:

$$A_{PX} = \sum_{k=1}^{N_{TX}} a_{kPX} \quad A_{EX} = \sum_{k=1}^{N_{TX}} a_{kEX},$$

where $a_{kP\chi}$ is an impinging complex amplitude from a kth transmit antenna of the radar DUT onto a position of the proxy transponder during phase coding $\chi$ and $a_{kE\chi}$ is an impinging complex amplitude from the kth transmit antenna of the radar DUT at the position of the desired emulant during phase coding $\chi$.

According to another aspect of the subject matter described herein, the proxy transponder is configured to apply gain correction to the output signal.

According to another aspect of the subject matter described herein, the proxy transponder is configured to calculate the gain correction using the following equation:

$$G_j = dB(A_{E\chi j}) - dB(A_{P\chi j})$$

where $G_j$ is the gain correction to be applied to the signal modulated using jth code $\chi_j$ dB( ) is a function that outputs a resultant field strength in decibels, $A_{E\chi j}$ is an amplitude of a signal at a position of the desired emulant and $A_{P\chi j}$ is an amplitude of a signal detected at the proxy transponder.

The subject matter described herein can be implemented in software in combination with hardware and/or firmware, with a preference towards hardware or firmware given the processing speeds required for real-time target emulation for testing FMCW radar. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Exemplary implementations of the subject matter described herein will now be explained with reference to the accompanying drawings, of which.

DETAILED DESCRIPTION

Automotive radars of today and the near future are either 3D or 4D, where the first three reporting dimensions are range, velocity, and azimuth and the fourth dimension is elevation angle. Often the term "direction of arrival" (DoA) is used to denote azimuth (and elevation for 4D radars). The vast majority of these radars are so-called fast FMCW, where "fast" means that a series of like (or somewhat like) chirps are transmitted at repetition rates on the order of 1-100 kHz and the Doppler or velocity information is gleaned from the phase progression of the received chirps upon reflection by the target or targets.

Furthermore, nearly all of the modern fast FMCW radars use MIMO (multiple-in, multiple-out) technology since it provides larger effective aperture than MISO (multiple-in, single-out) and therefore higher DoA resolution. The two most popular versions of MIMO are TDM-MIMO and CDM-MIMO, where TDM stands for time-division multiplexed and CDM stands for code-division multiplexed.

As described above, FMCW radar target emulation, and particularly radar scene emulation (RSE), can be implemented by frequency-shifting (f-shift) transponders [Refs. 1,2]. Due to the radar's chirp, an intermediate frequency (IF) shift on the order of sub-kHz to tens of MHz mimics a real time delay. The exact IF frequency chosen is proportional to the chirp slope (usually specified in MHz/us) and to the excess range. Here "excess" means the actual range being emulated less the RSE setup distance $d_{setup}$, where $$d_{setup} = d_{DT} + c\tau_{late}/2 \qquad (2)$$

$d_{DT}$ is the physical distance between the radar DUT and the transponder, c is the speed of light, and $\tau_{late}$ is the transponder latency, i.e., $\tau_{late}$ is the time lag it takes to receive the radar signal, electronically process it, and then retransmit. A typical $d_{DT}$ might be 75 cm and a typical $c\tau_{late}/2$ might be 5 cm, so a typical $d_{setup}$ would be ~0.8 m.

Figure 1:
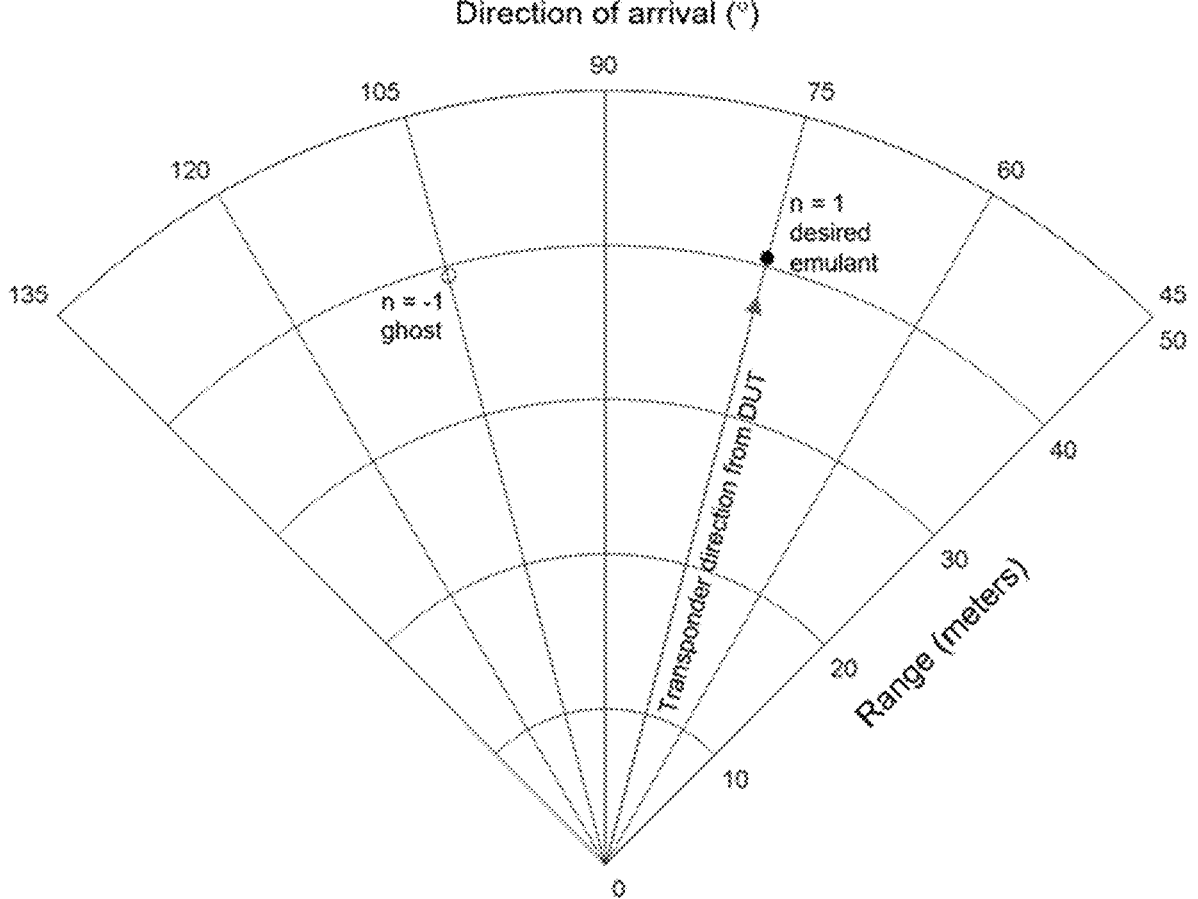
FIG. 1 is a top view of an emulated radar scene illustrating range and direction of arrival of a desired emulant radar signal and a ghost radar signal resulting from imperfect frequency shift spoofing by a frequency-shifting transponder of a radar scene emulator.

If the radar uses a double-sideband (DSB) receiver, an undesired type of ghost called the "image", "phase-conjugate", or "n=−1" ghost can appear in the signal output from the transponder. The desired emulant and the ghost signals are shown in FIG. 1. More particularly, FIG. 1 is a top view of an emulated radar scene illustrating range and direction of arrival of a desired emulant radar signal and a ghost radar signal resulting from imperfect frequency shift spoofing by a frequency-shifting transponder of a radar scene emulator.

In FIG. 1, the desired emulant radar signal is the n=1 sideband signal, and the ghost signal is the n=−1 sideband signal.

The term "n=−1" is used to refer to the ghost signal because this ghost arises electronically from an inadvertent opposite sideband shift spur in the transponder's output spectrum. The proper "n=1" sideband creates a fictitious excess range $$r_{excess} = r_{emulant} - d_{setup} \qquad (3)$$

In the example illustrated in FIG. 1, $d_{setup}$ is 0.8 m, and $r_{emulant}$ is 40.8 m. Thus, from Equation 3, the fictitious excess range, $r_{excess}$ resulting from the n=1 sideband signal output from the transponder is 0.8 m.

In contrast, the n=−1 spur creates an opposite excess=−$r_{excess}$. Men added to the setup distance, what results is $$r^* = 2d_{setup} - r_{emulant} \qquad (4)$$

Here, r* is the fictitious range resulting from the n=−1 signal output from the transponder. In FIG. 1, r*=2(0.8)−40.8=−39.2 m. For the vast majority of real-world targets, $r_{emulant} > 2d_{setup}$ so r* is negative.

For FMCW radar, if the radar is using upchirps (downchirps), a physically realistic positive range presents itself as a downshift(upshift) whereas a physically unrealistic negative range presents itself as an upshift(downshift). If the radar uses a single-sideband (SSB) receiver, the receiver automatically filters out the spurious negative-range signal because the receiver is designed to accept only the correct shift polarity. However, a DSB radar receiver folds the two shift cases on top of each other, meaning that the negative range becomes a positive range again:

$$r_{image} = -r^* = r_{emulant} - 2d_{setup} \qquad (5)$$

In Equation 5, $r_{image}$ is the range of the undesirable ghost image as detected by a dual sideband receiver. In the example in FIG. 1, $r_{image}$=39.2 m, which means that the ghost image is perceived by the radar as being a distance of 2 $d_{setup}$ or 1.6 m closer to the radar than the desired emulant. The folding over effect of a DSB radar also causes the ghost image to appear to have a direction of arrival (DoA) that originates from a mirror image direction from the desired emulant. This explains why the n=−1 ghost is a DoA mirror image of the desired emulant but appears slightly closer.

The image ghost disappears with perfect I/Q (in-phase/quadrature) balancing in the frequency shift operation, but perfection is never achieved. 30-40 dB ghost suppression relative to the desired emulant takes considerable effort.

For many automobile manufacturers and automobile component manufacturers, especially those interested in testing AEB (automatic emergency braking), even 30-40 dB suppression is insufficient and unacceptable when the ghost appears closer to the ego vehicle than the emulant itself. The autonomous drive control may initiate emergency braking when none is called for, resulting in poor fuel mileage, unpleasant passenger experience, etc.

On the other hand, if the mirror-like weak ghost were somehow further than the emulant, these same manufacturers (or at least many of them) will accept the situation.

The subject matter described herein includes a method for keeping the desired emulation target closer to the radar under test than its opposite-sideband ghost partner. It should be mentioned that one still strives for excellent I/Q balancing to weaken the ghost but given the inevitable outcome that the ghost signal won't be infinitely suppressed, what the methodology described herein achieves is a weak and further-than-emulant ghost.

Figure 2:
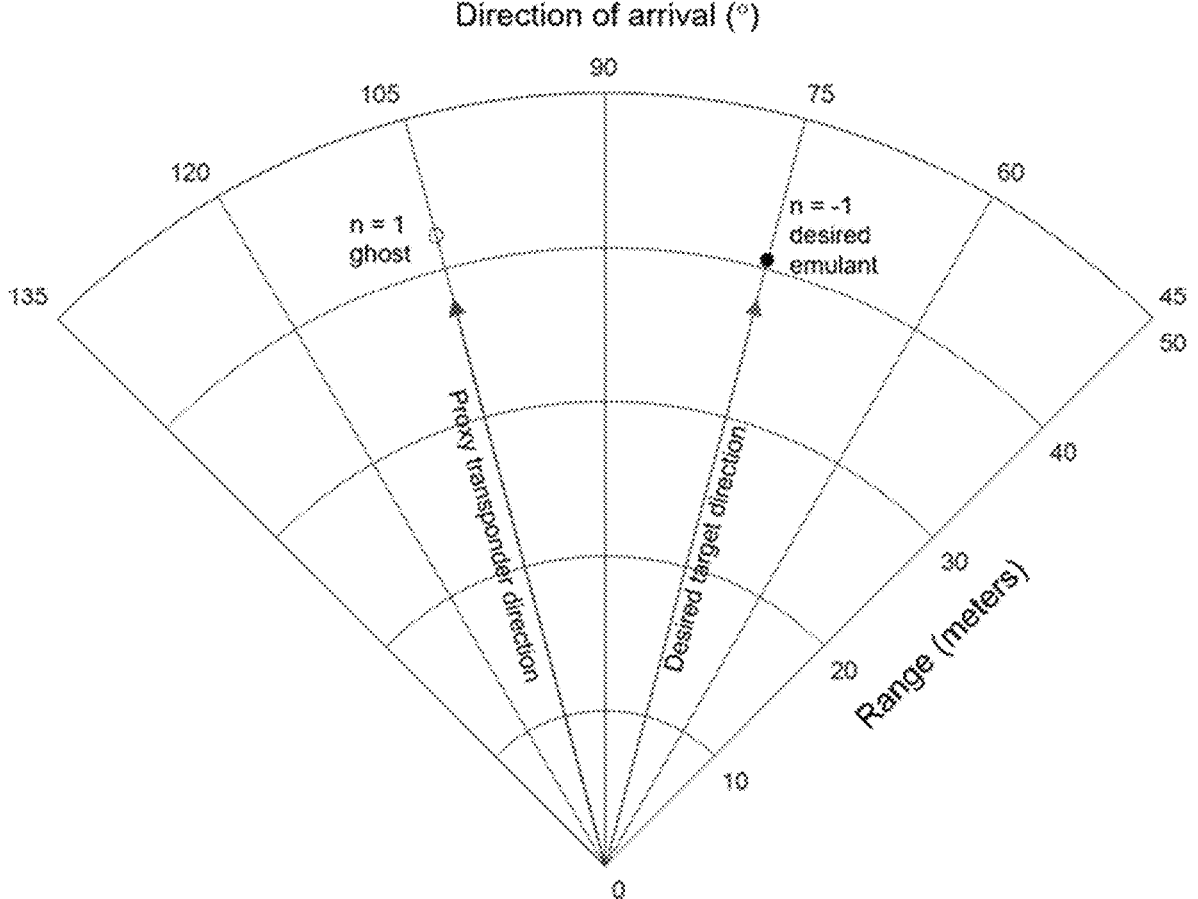
FIG. 2 is a top view of an emulated radar scene illustrating range and direction of arrival of a desired emulant radar signal and a ghost radar signal where the roles of the desired emulant and the ghost are swapped, and the emulated radar signal is transmitted from a frequency-shifting transponder that is in a mirror image location with respect to a desired direction of arrival.

FIG. 2 is a diagram illustrating a top view of an emulated radar scene where the roles of the ghost signal and the desired emulant signal are swapped by swapping the in phase (I) and quadrature (Q) modulation channels to generate a transponder output signal with the desired emulant closer to the radar under test than the ghost signal. In addition, the transponder chosen to output the emulated radar signal is in a mirror image direction from the desired direction of arrival, which causes the newly selected desired emulant to appear to originate from the desired direction of arrival.

Referring to FIG. 2, what we propose firstly is to switch the roles of the normal (n=1) and phase-conjugate (n=−1) transponder output frequency sidebands. By itself, this immediately accomplishes the interchange of "closer" vs. "further" but the emulant's DoA will be mirrored from what is desired. Therefore, secondly we intentionally pick a transponder on the mirror opposite side of the radar scene emulator [Ref 2]. "Mirror opposite" means opposite in both horizontal and vertical directions—see FIG. 3.

In FIG. 2, the point labeled n=−1 is the location of the desired emulant because of the above-described role swapping of the normal and phase conjugate sidebands of the emulated radar signal output from the transponder. The point labeled n=1 is the location of the ghost sideband. In FIG. 2, $d_{setup}$ is 0.8 m, $r_{emulant}$ is 40.8 m and $r_{ghost}$ is 42.4 m, which achieves the goal of the ghost signal being further from the radar under test than the desired emulant.

The desired direction of arrival in FIG. 2 is 75°, so to make the desired emulant appear to originate from 75°, a transponder located at 105° is chosen to originate the emulated radar signal. It is understood that FIG. 2 only shows the horizontal or azimuthal dimension of the emulated radar scene, and that the chosen transponder would also be located at a mirror image vertical (elevational) direction from the desired direction of arrival. The chosen transponder in FIG. 2 is referred to as the proxy transponder because the transponder is acting as a proxy for the desired direction of arrival.

Figure 3:
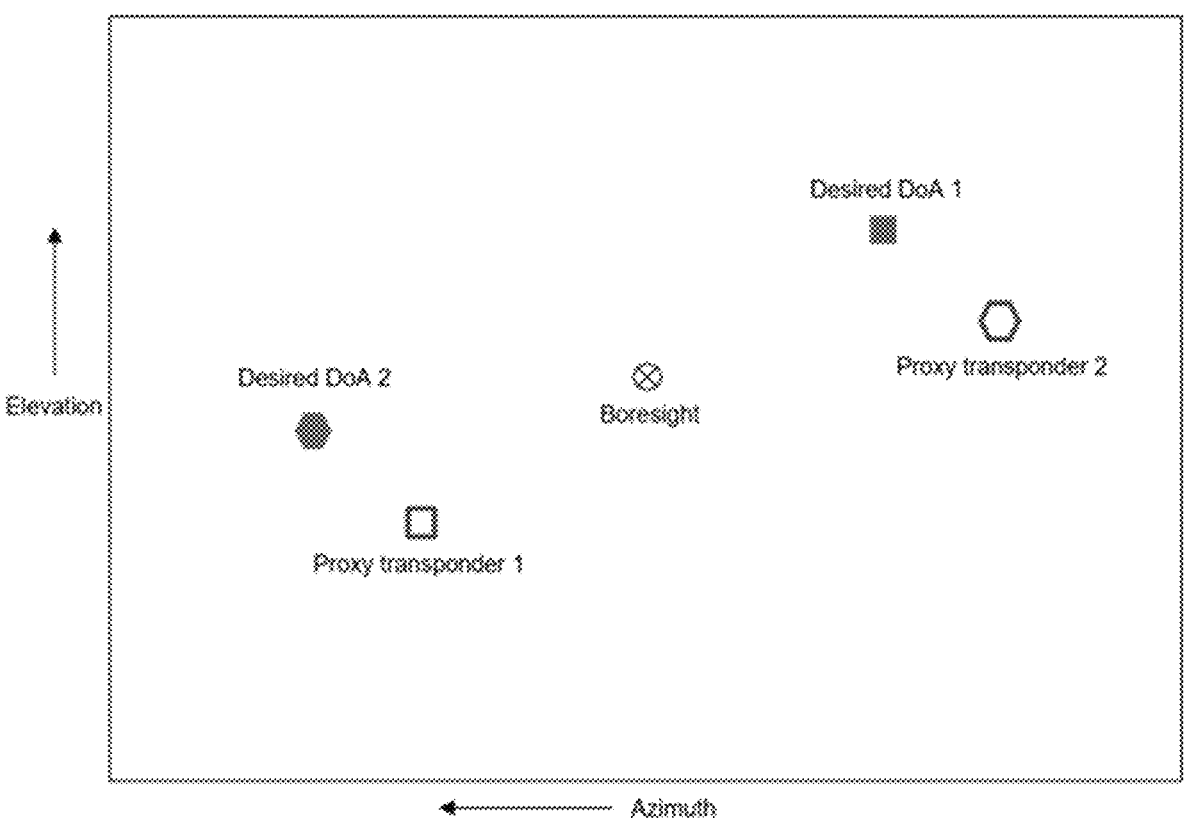
FIG. 3 is a Mercator-style projection of proxy directions and desired directions of arrival relative to the boresight of the radar DUT.

FIG. 3 is a Mercator-style depiction of proxy vs. desired directions relative to the radar's boresight. Typically, boresight points at the geometric center of the radar scene emulator, e.g., Ref. 2. In FIG. 3, the square labeled "Desired DoA 1" is located at a desired azimuthal and elevational position. The square labeled "Proxy transponder 1" is the location of the proxy transponder used to generate the emulated radar signal so that the desired emulant will appear to originate from the direction of the transponder located at Desired DoA 1. Proxy transponder 1 is located at the mirror image azimuthal and elevational directions from the transponder located at Desired DoA 1. Similarly, the hexagon labeled "Desired DoA 2" is located at another desired azimuthal and elevational position. The hexagon labeled "Proxy transponder 2" is the location of the proxy transponder from which the emulated radar signal is transmitted so that the desired emulant will appear to originate from Desired DoA 2. Proxy transponder 2 is located at a mirror image azimuthal and elevational position from Desired DoA 2. It should be noted that it is not required that a transponder be located at the position of the desired DoA, only that a transponder be located at a mirror image position of the desired DoA.

For multi-input single output (MISO) radars, the operations in the paragraphs described above suffice to achieve phase-conjugate target emulation. In practice what happens is we swap the I and Q signals applied to the transponder and readjust the IF to a higher (in absolute value) frequency than normal, specifically to:

$$f_{IF} = 2Sr_{excess,new}/c, \qquad (6.1)$$

where S is the chirp slope and $$r_{excess,new} = r_{emulant} + d_{setup} \qquad (6.2)$$

Notice the sign of $f_{IF}$ equals the sign of the chirp slope, which is appropriate for FMCW phase conjugation. In normal (no phase conjugation) target emulation, the sign of $f_{IF}$ opposes the sign of S.

Also, notice the change in sign of the $d_{setup}$ term compared to Eqn. (3). In this new formulation, the n=1 sideband becomes the ghost at range $r_{emulant}+2d_{setup}$ while the n=−1 sideband becomes the new desired emulant at a range of $r_{emulant}+d_{setup}$. As an aside, for some implementations the target radial velocity relative to the ego vehicle must also be sign-flipped, but some radar scene emulators, such as the Keysight AD1012A, automatically account for this with its SwapIQ software button and the subroutines activated by this button.

For multiple input multiple output (MIMO) radars, there is an additional consideration which is the fact that only the return rays from the transponder to the radar are perceived as having been phase conjugated, but the outbound rays from the radar to the transponder are not. Since there are multiple transmitting antennas in MIMO by definition, there are multiple outbound rays to any transponder, and the relative delays of these rays remain "normal" rather than phase conjugated because the transponder electronics process them causally.

The consequence of this mixed phase-conjugate return and normal outbound ray processing is an inadvertent emulation analogy of the physical situation known in the automotive radar world as "direction of arrival unequal to direction of departure" (DoA ≠ DoD). In this case, the two directions mirror each other. When this situation occurs—and it is rarely a strong effect in the real world—the radar's DoA algorithm gets confused. Most MIMO radars have more Rx channels than Tx channels, and the former are more densely spaced; hence, the perceived DoA is usually "in the ballpark", since the Rx channels carry more determination weight than the Tx channels, but the angular accuracy will fall outside of the vendor's specifications. Sometimes the perceived DoA can be wrong by tens of degrees.

A popular MIMO antenna geometry in many 4D radars is to use a nearly equal number of Rx and Tx channels, having the Rx antennas do most of the azimuth discernment and the Tx antennas do most of the elevation discernment. In this case, having inconsistent processing of the outbound vs. return rays will frequently result in gross DoA errors in both directions.

To correctly handle TDM-MIMO radars, our method incorporates a third ingredient, which is time slot phase correction. Specifically, since we already have phase control of the applied I and Q intermediate frequency signals, we adjust the return signal phases in a manner that depends on which Tx channel is the active chirper and which transponder in the radar scene emulator is being used as the proxy direction.

We can pick any of the radar's Tx antennas as the phase reference for the time slot phase correction. This is because we are already sufficient for multiple input single output (MISO) radars—it's the existence of the rest of the $N_{Tx}-1$ Tx antennas ($N_{Tx}$=#Tx channels>1) that make the DUT a MIMO radar, after all. Without loss of generality, let us choose the reference channel to be $Tx_1$.

For each time slot that $Tx_1$ is the active transmit channel, there is no phase correction at all. For each time slot that $Tx_k$ is the active channel where k>1, we add to both I and Q signals the phase correction $$\Phi_{k1} = \pm(360°/\lambda)*(d_{kE} - d_{kP} - d_{1E} + d_{1P}) \bmod 360° \quad (7)$$

where $\lambda$ is the radar transmit wavelength, $d_{kP}$ is the physical distance from $Tx_k$ to the proxy transponder, $d_{kE}$ is the distance from $Tx_k$ to the desired emulation mirror image position on the radar scene emulator, dip is the distance from $Tx_1$ to the proxy, and $d_{1E}$ is the distance from $Tx_1$ to the mirror image position. The "mod" function is the usual modulo wrapping function to limit the phase to a 360° span. (One could certainly use unwrapped phases, but these consume more bits of the emulator system's digital memory.)

Figure 4:
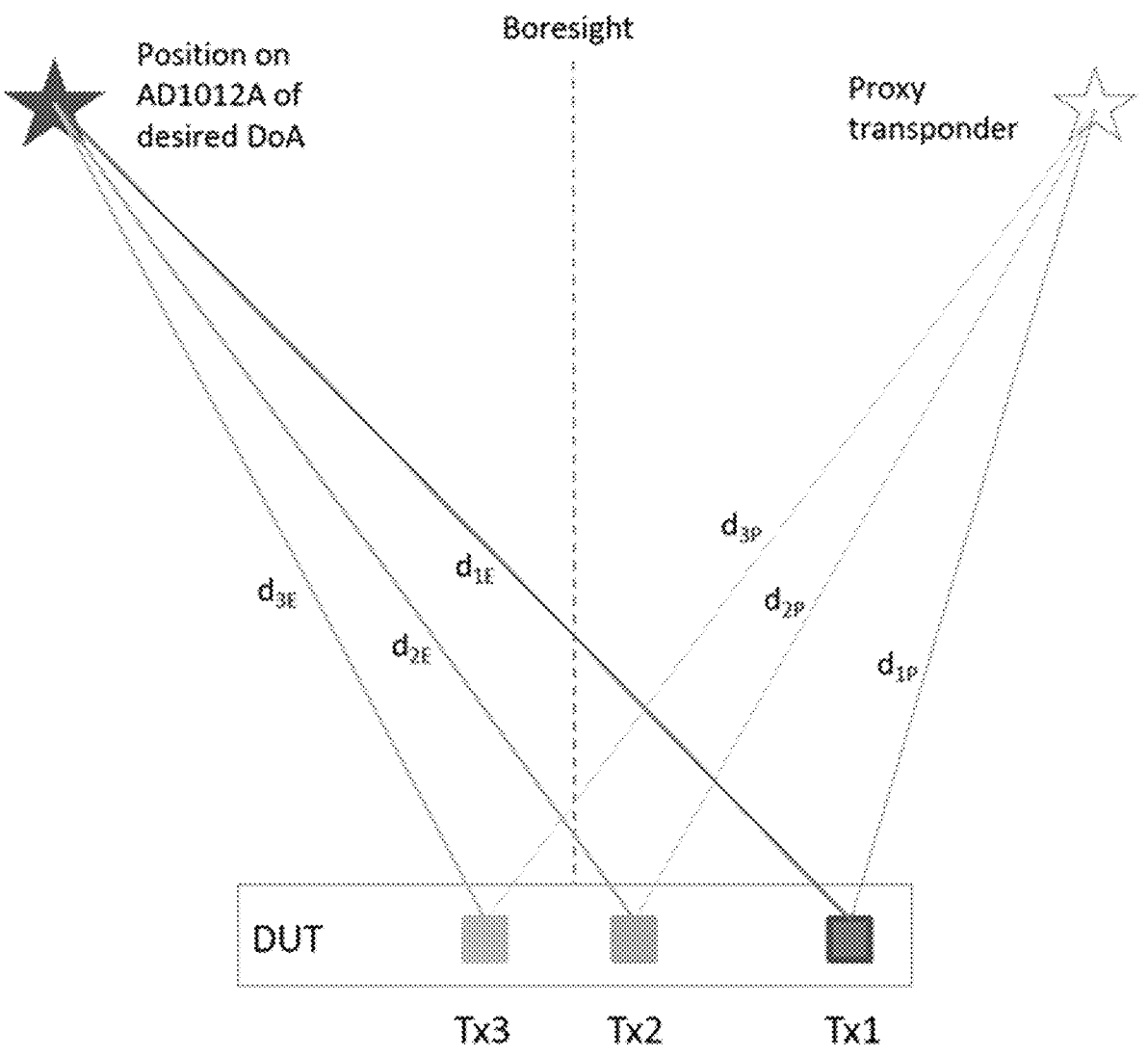
FIG. 4 is a top view of an emulated radar scene where the radar DUT is a MIMO radar with three transmit antennas.

FIG. 4 illustrates an example of a MIMO DUT with three transmit antennas. FIG. 4 also illustrates the distances represented in Equation 7 between each transmitting antenna and the proxy and desired DoA transponders. The distances illustrated in FIG. 4 are not intended to be to scale, only to illustrate that the distances between the desired emulant position and the proxy transponder position and the transmitting antenna are different depending on which antenna is transmitting.

The ± sign in the right hand side of Eqn. (7) is specified as follows: for upchirps we use the + sign, whereas for downchirps we use the − sign. The reasoning is as follows. For normal (no phase conjugation) emulation, a real-world return signal from an upchirp appears downshifted and hence a positive distance increment appears as a negative phase increment to the radar's coherent receiver. For phase-conjugate emulation, the opposite occurs; hence the + sign. Everything flips for a downchirp.

By applying the phase corrections of Eqn. (7) in the appropriate time slots and at the appropriate transponder locations, what we accomplish is realizing the correct relative-to-reference Tx to mirror direction phases. Thus, the outbound (Tx's to transponder) and return (transponder to Rx's) ray processing are now fully consistent for the MIMO DoA signal processing.

The AD1012A features a symmetric-about-boresight "screen" of transponders; hence the filled star in FIG. 4 corresponds to another transponder. However, this isn't necessary in general—i.e., in principle the filled star could be a virtual transponder position (no actual transponder device there).

In a similar vein, the proxy position could be an interpolated (virtual) position between two adjacent transponders in the AD1012A, in which case the filled star representing the desired emulant position in FIG. 4 would mirror-interpolate between the two Mercator-mirrored transponder positions of the AD1012A. Just as in normal (no phase conjugation) target interpolation [Ref. 3], our proposed method's DoA accuracy is not limited by transponder spacing. Of course, this is true for both azimuth and elevation when applied to 4D radars.

Certain parameters needed to exercise the proposed method are known due to knowledge of the radar DUT. Wavelength is known. Transmit channel sequence and chirp slope are often publicly known, e.g., by Federal Communications Commission (FCC) or CTC reports, and sometimes even provided by the radar vendor upon request. The slope may change over the course of the waveform, but this information is also either publicly available or obtainable upon request. When such is not the case, slope information can be measured in advance of scenario deployment. Modern radars often have several operational modes which differ in waveform. All modes can be characterized pre-deployment; during deployment, on-the-fly recognition of which mode is being used needn't happen at chirp timescale but rather at the much slower frame timescale.

The distances illustrated in FIG. 4 don't vary with time. They only depend on the DUT Tx antenna geometry, the mounting of the DUT within the radar scene emulator chamber, and the scene emulator transponder screen geometry. The first of these can be obtained by radar "teardown" photos, specifically a ruled photograph of the antenna printed circuit board (PCB). Careful mounting is part and parcel of a good radar scene emulator system. The emulator screen geometry is certainly known. The calculation of the distances in Eqn. (7) then reduces to application of the Pythagorean Theorem. The transmit sequence can also be inferred by selectively blocking Tx antennas, e.g., with anechoic foam, and observing which time slots are starved of signal.

We now treat the other commonly used MIMO type known as CDM-MIMO (CDM=code-division multiplexed). In CDM-MIMO, all radar Tx antennas are active simultaneously, but different chirp time slots feature different phase codings of the Tx channels. Walsh-Hadamard BPM (binary phase coding) is the oldest CDM technique and is still used. For example, if $N_{Tx}$=2, in one time slot $Tx_1$ and $Tx_2$ would be in phase, and, in another time slot, they would be 1800 out of phase. A recent variation of CDM-MIMO called DDM-MIMO (DDM=Doppler-division multiplexed) uses nonbinary phasing, e.g., 4-phase or 6-phase, to handle $N_{Tx}$>2.

Our principle for dealing with CDM-MIMO is a generalization of our TDM-MIMO treatment. Referring to FIG. 4 again as an example, for each phase coding $\chi$ we compute the complex resultants (sums) of the $N_{Tx}$ (=3 in FIG. 4) outbound waves impinging on the proxy (P) and at the filled star position (E):

$$A_{PX} = \sum_{k=1}^{N_{TX}} a_{kPX} \quad (8,9)$$

$$A_{EX} = \sum_{k=1}^{N_{TX}} a_{kEX},$$

where $a_{kP\chi}$ is the impinging complex amplitude from $Tx_k$ onto the proxy during phase coding $\chi$ and $a_{kE\chi}$ is the impinging complex amplitude from $Tx_k$ at the filled star position during phase coding $\chi$. In electromagnetic textbook fashion, the a's can be calculated (in electric field units of V/m) from the Tx phasing, the Tx antenna gains, the total transmit power for the given radar operation mode, and the "1/d" radiation rule for propagation of amplitudes. One uses $1/d_{kP}$ for $a_{kP\chi}$ and $1/d_{kE}$ for $a_{kE\chi}$. Typically, the Tx gains as well as power distribution are all equal in CDM-MIMO, so the calculations in Eqns. (8) and (9) mostly depend on the Tx phasing.

In analogy to the TDM case where we chose one of the Tx channels as the reference, we now choose one of the CDM codes as the phase reference. In FIG. 4, let's suppose that ternary (3-phase) DDM-MIMO is being used. The 3 mutually orthogonal codes are $0°-0°-0°$, $0°-120°-240°$, and $0°-240°-120°$, where the phases are listed in the order applied to $Tx_1$-$Tx_2$-$Tx_3$. (Note: in this example the number of codes equals $N_{Tx}$, but more generally the number of codes $\geq N_{Tx}$.) Let us call these codes $\chi 0$, $\chi 1$, and $\chi 2$, respectively. Without loss of generality, we can choose $\chi 0$ to be the phase reference code.

For each time slot that $\chi 0$ is the active code, no phase correction of the transponder I and Q signals is needed. When $\chi 1$ is the active code, we add to I and Q the phase correction $$\Phi_{10} = \pm [ang(A_{EX1}) - ang(A_{PX1}) - ang(A_{EX0}) + ang(A_{PX0})] \qquad (10)$$

where ang is the angle in degrees of the complex argument. As with the TDM case, the $\pm$ sign is chosen to be $+$ for upchirps and $-$ for downchirps. Likewise, when $\chi 2$ is the active code, we add to I and Q the phase correction $$\Phi_{20} = \pm [ang(A_{EX2}) - ang(A_{PX2}) - ang(A_{EX0}) + ang(A_{PX0})] \qquad (11)$$

This covers the phase correction portion of our CDM-MIMO treatment. Since the radar transmit far field radiation pattern is code-dependent in CDM-MIMO, we also need amplitude correction. To accurately handle RCS (radar cross section), we are not allowed to choose an arbitrary code as amplitude reference. Instead, we must P-to-E correct for each of the CDM codes. Continuing with FIG. 4 as our example, when a chirp time slot uses $\chi_j$ (j=0, 1, or 2) as the phase code, we apply a gain correction to the proxy transponder $$G_j = dB(A_{EXj}) - dB(A_{PXj}) \qquad (12)$$

where the dB function measures the resultant field strength in decibels (relative to 1 V/m, say). The gain correction is implemented by adjusting both I and Q drive strengths and/or adjusting the transponder's output variable attenuator.

The combination of phase and gain/amplitude corrections mimics the CDM time-dependent outbound wave superposition at position E even though the transponder processing these waves is at position P.

It should be clear that general CDM-MIMO, i.e., not just FIG. 4, is treated by accounting for all code-dependent phase corrections in analogy to Eqns. (10) and (11) and all code-dependent amplitude corrections per Eqn. (12). Also, the astute reader will notice that TDM-MIMO is just a special case of CDM-MIMO whereby the "coding" is Tx channel selection. Referring to FIG. 4, the "codes" are 1-0-0, 0-1-0, and 0-0-1 when selecting $Tx_1$, $Tx_2$, and $Tx_3$, respectively.

As with TDM-MIMO, parameter knowledge for the CDM-MIMO case is either obtained by published information or pre-deployment measurement. If the code time sequence isn't public or provided by the vendor, one way to infer it from measurement is to observe the signal strength vs. time across a series of chirps at several angular positions relative to the DUT. The number of positions should be roughly the number of codes or slightly greater preferably. Signal strength at each position will increase or decrease depending on code; as the code changes, the strong-signal and weak-signal positions will also change. This code-dependent "poor man's" far field information is used to deduce the code time sequence.

Figure 5:
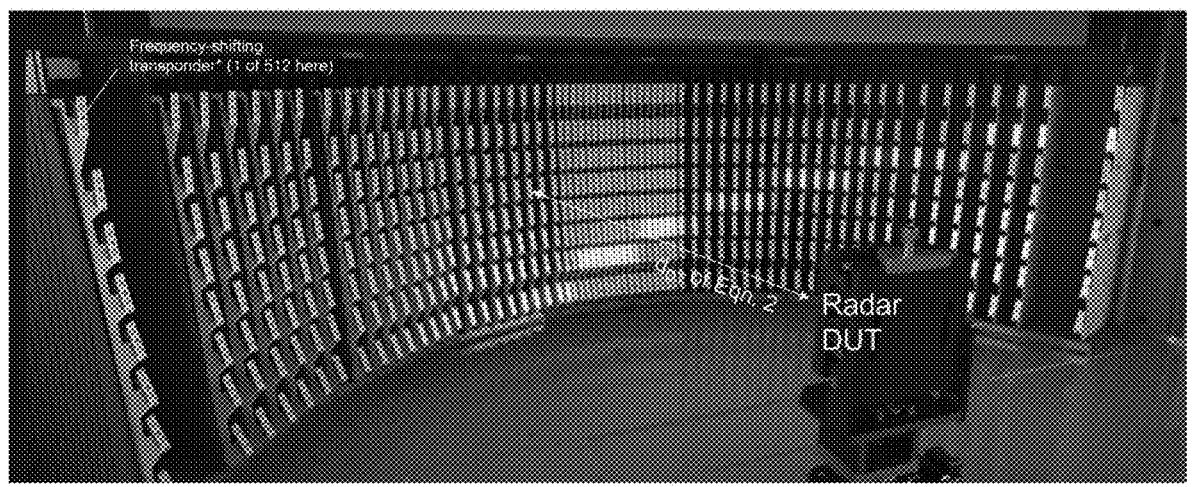
FIG. 5 is an image illustrating a radar scene emulator and a radar DUT.

FIG. 5 is an image illustrating a radar scene emulator including an array of frequency-shifting transponders and a radar DUT. In the example illustrated in FIG. 5, the array includes 512 frequency-shifting transponders, where transponders in the same row can be activated to emulate radar targets at a desired elevational position with respect to the radar DUT and transponders in the same column can be activated to emulate radar targets a desired azimuthal position with respect to the radar DUT. An example of a radar scene emulator suitable for implementing the subject matter described herein is the above-referenced AD1012A available from Keysight Technologies, Inc.

Figure 6:
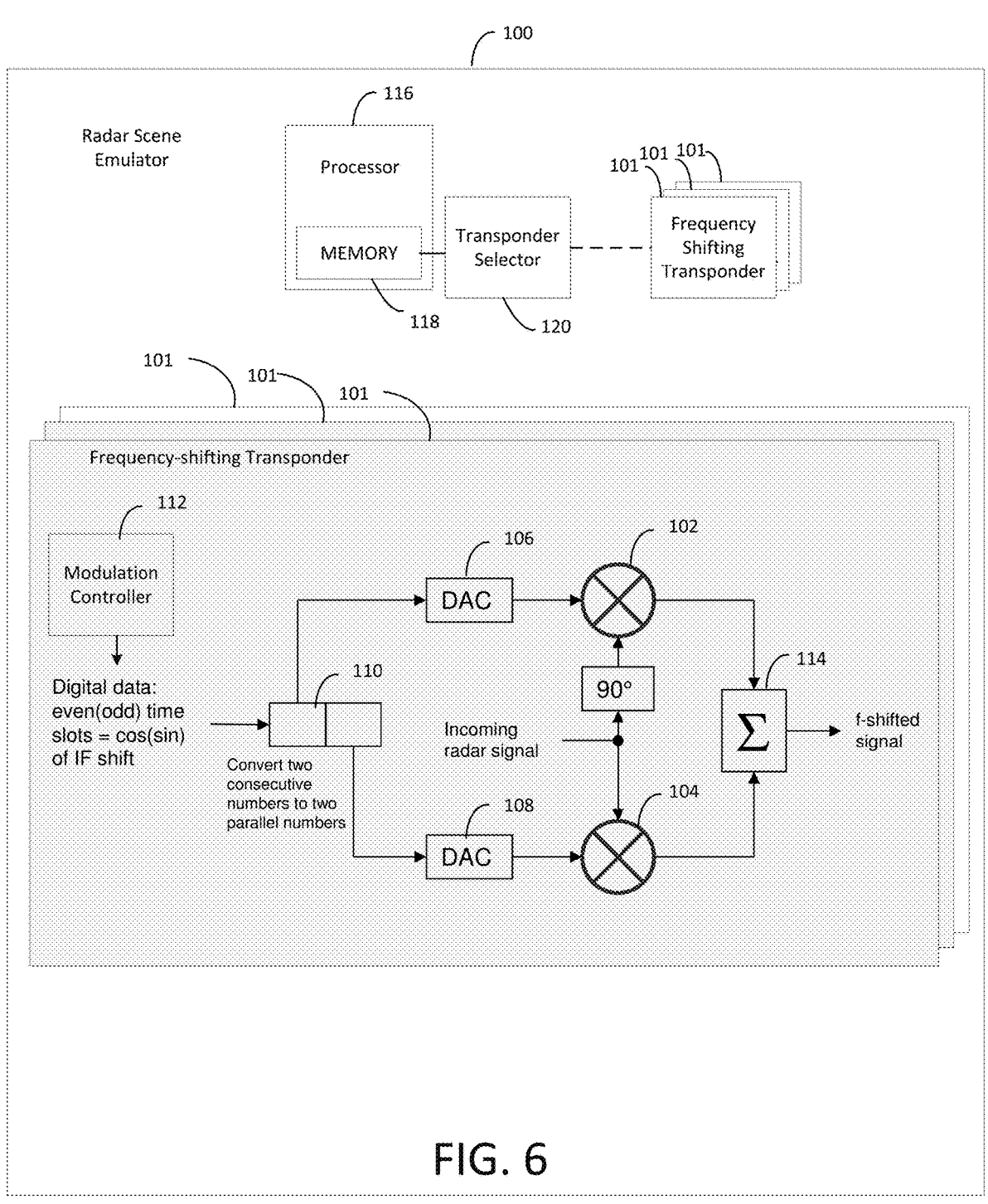
FIG. 6 is a block diagram illustrating a radar scene emulator.

FIG. 6 is a block diagram of a radar scene emulator including a plurality of frequency-shifting transponders suitable for emulating radar targets using phase conjugation as described herein. In FIG. 6, the components of each frequency-shifting transponder for achieving phase-conjugate target emulation are illustrated. It is understood that the frequency-shifting transponder includes other components, such as transmit and receive antennas and amplifiers for transmitting signals to and receiving signals from the radar DUT. Referring to FIG. 6, a radar scene emulator 100 includes an array of frequency-shifting transponders 101. Each frequency-shifting transponder 101 includes dual sideband (DSB) mixers 102 and 104. Mixer 102 mixes a 90° phase shifted version of the incoming signal from the radar DUT with a modulating signal output from digital to analog converter (DAC) 106. Mixer 104 mixes an in-phase version of the incoming radar signal from the radar DUT with a modulating signal output from DAC 108. The modulating signal output from DACs 106 and 108 is produced based on a sequence of digital data input to a splitter 110 by a modulation controller 112.

A summer 114 sums the signals output from mixers 102 and 104 to produce the frequency shifted output signal that results in the intermediate frequency signal detected by the radar DUT such that the radar DUT perceives the desired emulant to be located at the range specified by Equation 6.

Phase conjugation is achieved in transponder 101 by switching the interleaving of data provided to splitter 110. To achieve the IF (the amount of either upshift or downshift) is generally <30 MHz. Automotive radars chirp in the 76-77 GHz or 77-81 GHz bands, so this frequency shift is a very small fraction of the operating frequency. With such a low shift frequency, one simply sends digital signals to the DACs 106 and 108, which convert the digital signals to analog IF signals appearing at the left hand sides of DSB mixers 102 and 104 in the diagram.

In operation, modulation controller 112 provides an interleaved stream of digital numbers coming into splitter 110. In the "normal" case, modulation controller 112 may interleave the data provided to splitter 110 by having the even time slots represent cos(2pi*f_IF*t) and the odd time slots represent sin(2pi*f_IF*t). In the phase conjugate case, even slots become sin(2pi*f_IF*t) and odd slots become cos (2pi*f_IF*t). What is considered "normal" depends on the sign of the chirp slope, as described above. That is, for an up chirp, the receiver in the non-emulated, non-phase-conjugated case, would normally receive a down-shifted version of the transmitted signal. For a down chirp, the receiver would normally receive an up-shifted version of the transmitted signal. Whatever the "normal" assignment happens to be, phase conjugation simply swaps the interleaving, which causes the transponder to upshift the frequency of the transmitted radar signal for up chirps and downshift the frequency of the transmitted radar signal for down chirps. The amount of frequency upshift or downshift in the signal output from transponder 101 is equal to $F_{IF}$ as defined in Eqn. (6.2). Modulation controller 112 may also apply amplitude and phase correction for the MIMO cases described above.

Radar scene emulator 100 includes at least one processor 116 with on-chip memory 118. A transponder selector 120 selects the desired proxy transponder to emulate a radar target from a desired direction of arrival. Transponder selector 120 may be implemented using computer executable instructions stored in memory 118 and executed by processor 116.

Figure 7:
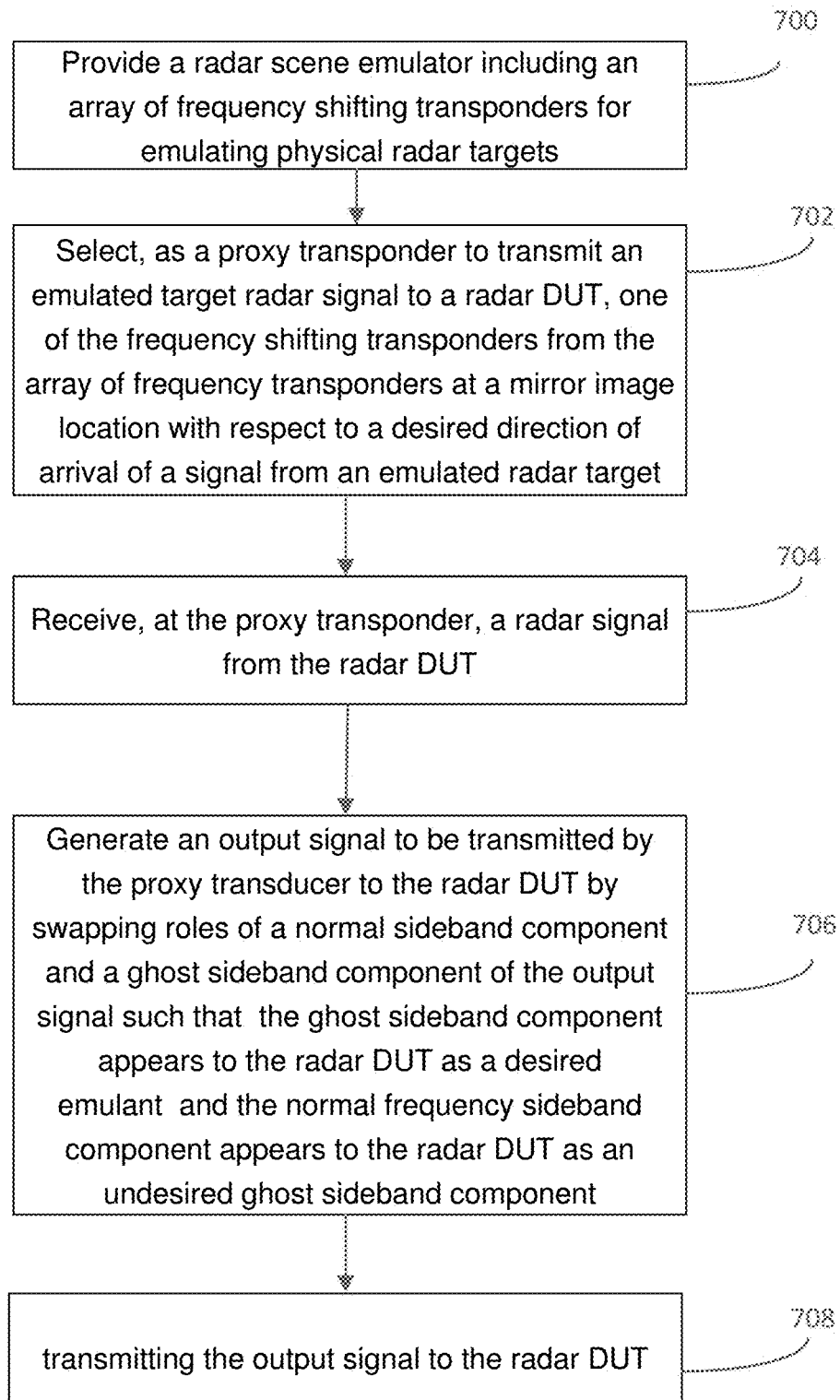
FIG. 7 is a flow chart illustrating an exemplary process for phase-conjugate target emulation for testing a DSB FMCW radar.

FIG. 7 is a flow chart illustrating an exemplary process for phase-conjugate target emulation for testing a DSB FMCW radar. Referring to FIG. 7, in step 700, the process includes providing a radar scene emulator including an array of frequency-shifting transponders for emulating physical radar targets. For example, a radar scene emulator, such as that illustrated in FIGS. 5 and 6 may be provided.

In step 702, the process includes selecting, as a proxy transponder to transmit an emulated target radar signal to a radar DUT, one of the frequency-shifting transponders from the array of frequency-shifting transponders at a mirror image location with respect to a desired direction of arrival of a signal from an emulated radar target. For example, one of the frequency-shifting transponders in the array that is in a mirror image location from the desired direction of arrival of the emulated radar signal may be selected as the proxy transponder. Examples of desired directions of arrival and proxy transponder locations are shown in FIGS. 2 and 3.

In step 704, the process further includes receiving, at the proxy transponder, a radar signal from the radar DUT. For example, the selected proxy transponder may receive a chirp radar signal from the radar DUT.

In step 706, the process further includes generating an output signal to be transmitted by the proxy transponder to the radar DUT by swapping roles of a normal sideband component and a ghost sideband component of the output signal such that the ghost sideband component appears to the radar DUT as a desired emulant, and the normal sideband component appears to the radar DUT as an undesired ghost sideband component. For example, the selected proxy transponder may swap the roles of the in-phase and quadrature components of the output signal by switching the I and Q modulation channels used to generate the output signal. If the radar DUT expects the in-phase modulated signal on even timeslots and the quadrature-modulated signal on odd time slots, the proxy transponder outputs a quadrature modulated radar signal on even timeslots and an in-phase modulated signal on odd time slots. If the radar DUT expects the quadrature-modulated signal on even timeslots and the in-phase-modulated signal on odd time slots, the proxy transponder outputs an in-phase modulated radar signal on even timeslots and a quadrature modulated signal on odd time slots. The switching of the modulation channels may be effected by inverting the digital bit stream input to the proxy transponders to control the I and Q mixing, as described above with respect to FIG. 6.

In step 708, the process further includes transmitting the output signal to the radar DUT. For example, the proxy transponder transmits the signal to the radar DUT. The radar DUT receives the signal, mixes the signal with the transmitted signal, determines the intermediate frequency, and calculates the range of the emulated radar target using Equation 1. Because of the modulation role switching and the frequency-shifting (see Equation 6), the desired emulant appears closer to the radar DUT than the undesirable ghost signal.

The subject matter described herein includes at least the following ideas:

1. An FMCW radar scene emulator method which pushes a DSB radar spurious ghost, however strong or weak, to a more distant range than a desired emulant range by phase-conjugate frequency-shifting and choosing a frequency-shifting transponder in a direction which mirrors a desired emulant direction.

2. Using the radar scene emulator, the spurious ghost is made more distant than the desired emulant by frequency-shifting a return signal to the radar such that a detected intermediate frequency S being an FMCW chirp slope and $r_{excess,new}$ is given by Eqn. (6.2).

3. The frequency-shifting radar scene emulator can also be extended for TDM-MIMO radars to apply time slot phase corrections to the transponder I and Q frequency-shift signals, and the time slots are categorized by active radar Tx channel.

4. The phase corrections are calculated based on picking an arbitrary reference Tx channel.

5. The phase correction=0 whenever a reference channel is the active channel.

6. The phase correction is governed by Eqn. (7) when the active channel is not the reference channel.

7. The sign of the phase correction in Eqn. (7) is positive for upchirps and negative for downchirps.

8. A ruled photograph of the radar antenna printed circuit board (PCB) is used to calculate the (outbound ray) distances in Eqn. (7).

9. An x-ray of the radar case is used when a PCB photograph is unavailable. (The antennas show up well due to the copper and gold in their metallization.)

10. A transmit sequence of the DUT is determined by selectively blocking DUT Tx antennas prior to scenario deployment if the transmit sequence is not publicly known or provided by the vendor.

11. The radar scene emulator can perform phase-conjugate DoA interpolation to when the desired direction of arrival is between two of the frequency-shifting transponders.

12. The radar scene emulator can be used to test CDM-MIMO radars where time slot phase corrections are applied to the transponder I and Q signals based on phase differences of Tx complex resultants (see Eqns. (10) and (11)) and time slot gain corrections are applied based on magnitude difference of the complex resultants (see Eqn. (12)).

13. In testing the CDM-MIMO radars, gain corrections are applied to the transponder I and Q signals.

14. The gain corrections are applied at the transponder output variable attenuator.

15. Multiple power sensing positions are used prior to scenario deployment to record a "poor man's" far field pattern vs. time slot and this information is used to deduce the CDM code vs. time slot.

The disclosure of each of the following references is incorporated herein by reference in its entirety.

REFERENCES

1. "Automotive Forward Looking Sensor Test Station", Mark E. Russell and Clifford A. Drubin, U.S. Pat. No. 6,114,985, Sep. 5, 2000.
2. "Evolving Your ADAS and AV Tests with Emulation Capability, Keysight, White Paper, Jun. 1, 2022.
3. "Coordinated Mini-Radar Target Simulators for Improved Accuracy and Improved Ghost Cancellation", Gregory S. Lee, Gregory Douglas Vanwiggeren, and Ken A. Nishimura, U.S. Patent Application Publication No. 22/0019834, Jan. 20, 2022.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for phase-conjugate target emulation for testing a dual sideband (DSB) frequency modulated continuous wave (FMCW) radar, the method comprising:

providing a radar scene emulator including an array of frequency-shifting transponders for emulating physical radar targets;

selecting, as a proxy transponder to transmit an emulated target radar signal to a radar device under test (DUT), one of the frequency-shifting transponders from the array of frequency-shifting transponders at a mirror image location with respect to a desired direction of arrival of a signal from an emulated radar target;

receiving, at the proxy transponder, a radar signal from the radar DUT;

generating an output signal to be transmitted by the proxy transponder to the radar DUT by swapping roles of a normal sideband component and a ghost sideband component of the output signal such that the ghost sideband component appears to the radar DUT as a desired emulant and the normal sideband component appears to the radar DUT as an undesired ghost sideband component; and transmitting the output signal to the radar DUT.

2. The method of claim 1 wherein providing the radar scene emulator including the array of frequency-shifting transponders includes providing a two dimensional array of frequency-shifting transponders and selecting the proxy transponder at the mirror image location with respect to the desired direction of arrival includes selecting as the proxy transponder one of the frequency-shifting transponders located at a mirror image azimuth and elevational location with respect to the desired direction of arrival.

3. The method of claim 1 wherein swapping the roles of the normal and ghost sideband components includes swapping modulation channels used to generate the output signal such that the modulation channels are opposite those used by the radar DUT to demodulate the output signal.

4. The method of claim 3 wherein generating the output signal includes causing the radar DUT to detect an intermediate frequency as follows:

$$f_{IF} = 2Sr_{excess,new}/c,$$

where $f_{IF}$ is the intermediate frequency, S is a chirp slope of the radar signal from the radar DUT, c is the speed of light in a vacuum, and $r_{excess,new}$ is given by $$r_{excess,new} = r_{emulant} + d_{setup},$$

where $r_{excess,new}$ is a range to which the ghost component is shifted, $r_{emulant}$ is a range of the desired emulant, and $d_{setup}$ is an effective distance from the proxy transponder to the radar DUT including a distance that accounts for processing latency of the proxy transponder.

5. The method of claim 1 wherein the radar DUT comprises a time division multiplexed (TDM) multiple input multiple output (MIMO) radar and wherein the method further comprises applying phase corrections to output signals transmitted to the radar DUT to account for different ranges from the proxy transponder to different antennas of the TDM MIMO radar.

6. The method of claim 5 wherein applying the phase corrections includes determining the phase corrections using the following equation:

$$\Phi_{k1} = \pm(360°/\lambda)*(d_{kE} - d_{kP} - d_{1E} + d_{1P}) \bmod 360°,$$

where $\phi_{k1}$ is a phase correction to be applied to a signal output from the proxy transponder to a kth transmitting antenna of the radar DUT, $\lambda$ is a transmit wavelength of the TDM MIMO radar, $d_{kP}$ is the physical a distance from the kth transmitting antenna of the radar DUT to the proxy transponder, $d_{kE}$ is a distance from the kth transmitting antenna of the radar DUT to a desired emulation mirror image position on the radar scene emulator, $d_{1P}$ is a distance from the kth transmitting antenna to the proxy transponder, and $d_{1E}$ is a distance from the kth transmitting antenna to the desired emulation mirror image position, and mod is a modulo function.

7. The method of claim 1 wherein the radar DUT comprises a code division multiplexed (CDM) multiple input multiple output (MIMO) radar and wherein the method further comprises applying phase corrections to output signals transmitted to the CDM MIMO radar to account for different ranges from the proxy transponder to different antennas of the CDM MIMO radar.

8. The method of claim 7 wherein applying the phase corrections includes determining the phase corrections using the following equation:

$$\phi_{10} = \pm\left[ang(A_{E_\chi 1}) - ang(A_{P_\chi 1}) - ang(A_{E_\chi 0}) + ang(A_{P_\chi 0})\right]$$

19 where $\phi_{10}$ is the phase correction to be applied to active code $\chi1$, ang( ) is a function that returns an angle in degrees of a complex argument, $A_{P\chi}$ and $A_{E\chi}$ are given by:

$$A_{P_\chi} = \sum_{k=1}^{N_{TX}} a_{kP_\chi}$$

$$A_{E_\chi} = \sum_{k=1}^{N_{TX}} a_{kE_\chi}$$

where $a_{kP_\chi}$ is an impinging complex amplitude from a kth transmit antenna of the radar DUT onto a position of the proxy transponder during phase coding $\chi$ and $a_{kE_\chi}$ is an impinging complex amplitude from the kth transmit antenna of the radar DUT at the position of the desired emulant during phase coding $\chi$.

9. The method of claim 7 comprising applying gain correction to the output signal.

10. The method of claim 9 comprising calculating the gain correction using the following equation:

$$G_j = dB(A_{E_{\chi j}}) - dB(A_{P_{\chi j}}),$$

where $G_j$ is the gain correction to be applied to the signal modulated using jth code $\chi_j$ dB( ) is a function that outputs a resultant field strength in decibels, $A_{E_{\chi j}}$ is an amplitude of a signal at a position of the desired emulant and $A_{P_{\chi j}}$ is an amplitude of a signal detected at the proxy transponder.

11. A system for phase-conjugate target emulation for testing a dual sideband (DSB) frequency modulated continuous wave (FMCW) radar, the system comprising:
 a radar scene emulator including at least one processor, a memory, and an array of frequency-shifting transponders for emulating physical radar targets;
 a transponder selector implemented by the at least one processor for selecting, as a proxy transponder to transmit an emulated target radar signal to a radar DUT, one of the frequency-shifting transponders from the array of frequency-shifting transponders at a mirror image location with respect to a desired direction of arrival of a signal from an emulated radar target;
 wherein the proxy transponder is configured to:
  receive a radar signal from the radar DUT;
  generate an output signal to be transmitted to the radar DUT by swapping roles of a normal sideband component and a ghost sideband component of the output signal such that the ghost sideband component appears to the radar DUT as a desired emulant and the normal sideband component appears to the radar DUT as an undesired ghost sideband component; and
  transmit the output signal to the radar DUT.

12. The system of claim 11 wherein the array of frequency-shifting transponders includes providing a two dimensional array of frequency-shifting transponders and selecting the proxy at the mirror image location with respect to the desired direction of arrival includes selecting as the proxy transponder one of the frequency-shifting transponders located at a mirror image azimuth and elevational location with respect to the desired direction of arrival.

13. The system of claim 11 wherein the proxy transponder is configured to swap the roles of the normal and ghost sideband components by swapping modulation channels used to generate the output signal such that the modulation channels are opposite those used by the radar DUT to demodulate the output signal.

14. The system of claim 13 wherein the proxy transponder is configured to generate the output signal causing the radar DUT to detect an intermediate frequency as follows:

$$f_{IF} = 2Sr_{excess,new}/c,$$

where $f_{IF}$ is the intermediate frequency, S is a chirp slope of the radar signal from the radar DUT, c is the speed of light in a vacuum, and $r_{excess,new}$ is given by $$r_{excess,new} = r_{emulant} + d_{setup},$$

where $r_{excess,new}$ is a range to which the ghost component is shifted, $r_{emulant}$ is a range of the desired emulant, and $d_{setup}$ is an effective distance from the proxy transponder to the radar DUT including a distance that accounts for processing latency of the proxy transponder.

15. The system of claim 11 wherein the radar DUT comprises a time division multiplexed (TDM) multiple input multiple output (MIMO) radar and wherein the proxy transponder is configured to apply phase corrections to output signals transmitted to the radar DUT to account for different ranges from the proxy transponder to different antennas of the TDM MIMO radar.

16. The system of claim 15 wherein the proxy transponder determines the phase corrections using the following equation:

$$\phi_{k1} = \pm(360°/\lambda) * (d_{kE} - d_{kP} - d_{1E} + d_{1P}) \bmod 360°,$$

where $\phi_{k1}$ is a phase correction to be applied to a signal output from the proxy transponder to a kth transmitting antenna of the radar DUT, $\lambda$ is a transmit wavelength of the TDM MIMO radar, $d_{kP}$ is a distance from the kth transmitting antenna of the radar DUT to the proxy transponder, $d_{kE}$ is a distance from the kth transmitting antenna of the radar DUT to a desired emulation mirror image position on the radar scene emulator, $d_{1P}$ is a distance from the kth transmitting antenna to the proxy transponder, and $d_{1E}$ is a distance from the kth transmitting antenna to the desired emulation mirror image position, and mod is a modulo function.

17. The system of claim 11 wherein the radar DUT comprises a code division multiplexed (CDM) multiple input multiple output (MIMO) radar and wherein the proxy transponder is configured to apply phase corrections to output signals transmitted to the CDM MIMO radar to account for different ranges from the proxy transponder to different antennas of the CDM MIMO radar.

18. The system of claim 17 wherein the proxy transponder is configured to determine the phase corrections using the following equation:

$$\phi_{10} = \pm[ang(A_{E_{\chi}1}) - ang(A_{P_{\chi}1}) - ang(A_{E_{\chi}0}) + ang(A_{P_{\chi}0})],$$

where $\phi_{10}$ is the phase correction to be applied to active code $\chi 1$ ang( ) is a function that returns an angle in degrees of a complex argument, $A_{P\chi}$ and $A_{E\chi}$ are given by:

$$A_{P_\chi} = \sum_{k=1}^{N_{TX}} a_{kP_\chi}$$

$$A_{E_\chi} = \sum_{k=1}^{N_{TX}} a_{kE_\chi}$$

where $a_{kP_\chi}$ is an impinging complex amplitude from a kth transmit antenna of the radar DUT onto a position of the proxy transponder during phase coding $\chi$ and $a_{kE\chi}$ is an impinging complex amplitude from the kth transmit antenna of the radar DUT at the position of the desired emulant during phase coding $\chi$.

19. The system of claim 17 wherein the proxy transponder is configured to apply gain correction to the output signal.

20. The system of claim 19 wherein the proxy transponder is configured to calculate the gain correction using the following equation:

$$G_j = dB\left(A_{E_{\chi j}}\right) - dB\left(A_{P_{\chi j}}\right),$$

where $G_j$ is the gain correction to be applied to the signal modulated using jth code $\chi_j$ dB( ) is a function that outputs a resultant field strength in decibels, $A_{E\chi j}$ is an amplitude of a signal at a position of the desired emulant and $A_{P\chi j}$ is an amplitude of a signal detected at the proxy transponder.

* * * * *